United States Patent [19]

Porat

[11] Patent Number: 4,643,400

[45] Date of Patent: Feb. 17, 1987

[54] TRIP-WIRE GUIDING DEVICE AND PROTECTIVE FENCE INCLUDING SAME

[75] Inventor: Chaim Porat, Beer-sheva, Israel

[73] Assignee: Beta Engineering and Development Ltd., Beersheva, Israel

[21] Appl. No.: 111,280

[22] Filed: Jan. 11, 1980

[51] Int. Cl.[4] ........................ E04H 17/12; A01K 3/00

[52] U.S. Cl. ........................................ 256/52; 256/10

[58] Field of Search ...................... 256/52, 48, 49, 56, 256/10; 200/61.93

[56] References Cited

U.S. PATENT DOCUMENTS

| | | | |
|---|---|---|---|
| 475,865 | 5/1892 | Hudson . | |
| 542,853 | 7/1895 | Hitchcock | 256/56 |
| 568,744 | 10/1896 | Cook . | |
| 755,427 | 3/1904 | Wright | 256/52 |
| 759,838 | 5/1904 | Willmarth . | |
| 792,476 | 6/1905 | Sutherland | 256/52 |
| 805,349 | 11/1905 | Douglass . | |
| 893,156 | 7/1908 | Fewins | 256/52 X |
| 1,117,214 | 11/1914 | McFarland et al. | 256/52 |
| 1,561,976 | 11/1925 | Donahoe, Jr. | 256/52 |
| 2,238,523 | 4/1941 | Holst | 256/56 X |
| 3,502,303 | 3/1970 | Bishop | 256/52 X |
| 3,932,718 | 1/1976 | Porat | 200/61.93 |
| 4,155,083 | 5/1979 | Slaats et al. | 256/10 X |

FOREIGN PATENT DOCUMENTS

| | | | |
|---|---|---|---|
| 225594 | 12/1959 | Australia | 256/52 |
| 234995 | 8/1961 | Australia | 256/48 |
| 180409 | 11/1917 | Canada . | |
| 1097903 | 1/1968 | United Kingdom | 256/48 |

*Primary Examiner*—James Kee Chi

*Attorney, Agent, or Firm*—Benjamin J. Barish

[57] ABSTRACT

A trip-wire guiding device for a protective fence is described including an elongated member attachable to ground-anchoring means intermediate the fence poles and formed with a plurality of openings through which the tensioned trip-wire are passed for maintaining them in parallel space relationship. Each trip-wire is insertable into the opening via a passageway extending from the opening to the edge of the member. A common locking member is received in a channel extending longitudinally through the elongated member aligned with and passing through the passageways, the common locking member being effective to lock the trip-wires in their respective opening against removal through the passageways, but permits their longitudinal movement, such as to cause the detector means to be actuated upon a change in tension in the trip-wires, but to preclude disabling the detector means by merely fastening the tensioned trip-wires to the wire-guiding member or to the common locking member fixed thereto.

In several described embodiments the elongated trip-wire guiding member is made of sheet metal, and in a further described embodiment it comprises an open spiral rod.

8 Claims, 11 Drawing Figures

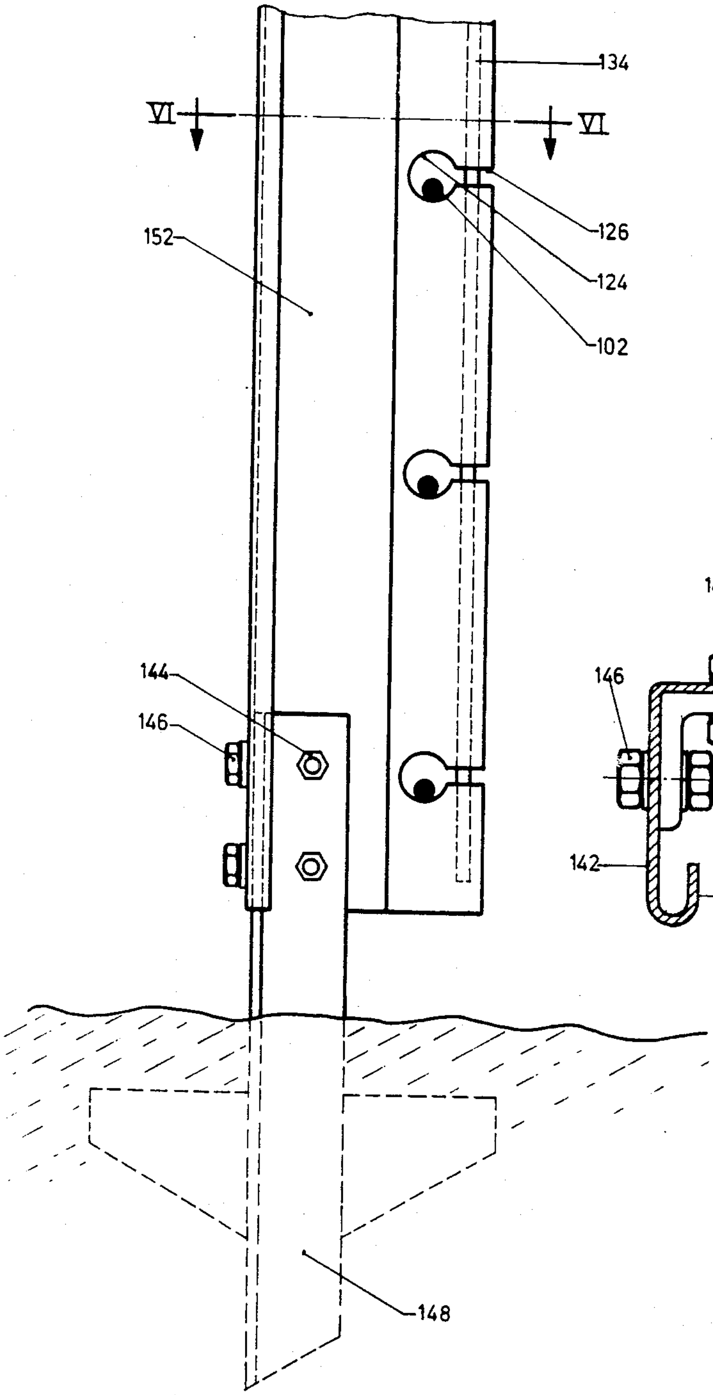
FIG.5
FIG.6
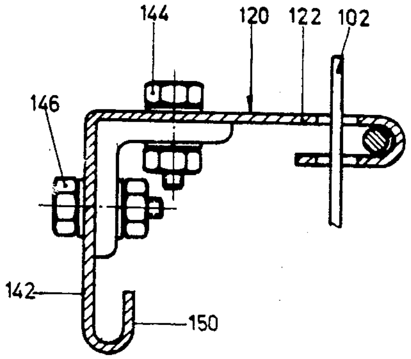

TRIP-WIRE GUIDING DEVICE AND PROTECTIVE FENCE INCLUDING SAME

BACKGROUND OF THE INVENTION

The present invention relates to a trip-wire guiding device for a protective fence, and particularly to the type which includes a plurality of trip-wires tensioned between a pair of fence poles and connecting to detector means actuated upon the disturbance of any of the trip-wires by an attempted penetration of the fence. The invention also relates to a protective fence including such a trip-wire guiding device.

Protective fences are gaining widespread use for protecting restricted areas against unauthorized penetration or intrusion. One form of protective fence includes a plurality of trip-wires tensioned between a pair of fence poles and connected to detector means which are actuated upon the disturbance of the wires by an attempted penetration of the fence. Such protective fences commonly include wire-guiding devices attachable to ground anchoring means, for example other fence poles, intermediate the pair of fence poles supporting the tensioned wires, the wire-guiding device being formed with a plurality of openings through which the wires are to be passed for maintaining them in parallel spaced relationship to assure that any disturbance of the wires, such as by cutting, spreading-apart, or pressing-downwardly, will be transmitted to the detector means and will thereby be detected. Such a wire-guiding device is usually attached to its ground-anchoring means in a force-yielding manner to prevent an attempted intruder from disabling the system by merely fastening the wires to the guiding device, since if he does this, the whole wire-guiding device will yield in case of a force applied to the fastened wire, thereby transmitting the force to the detector means.

The presently-used guiding devices are generally in the form of elongated members, e.g. bars, having a plurality of openings through which the wires are passed, each opening being connected by a slot to the edge of the elongated member to permit the insertion of the respective wire. Each slot is closed by a pop-rivet or like fastener to prevent removal of the wire. However, such arrangements are time-consuming to install since they require a rivet or like fastener to be applied to each opening receiving a wire, there usually being in the order of thirteen wires in such a fence. In addition, it is not particularly difficult for an intruder, using a simple hand-tool, to remove or bend the pop-rivet in order to permit the removal of the wire through its slot, thereby disabling the system.

SUMMARY OF THE PRESENT INVENTION

An object of the present invention is to provide a trip-wire guiding device for a protective fence having advantages in the above respects. Another object of the invention is to provide a protective fence including the novel wire-guiding device.

According to a broad aspect of the present invention, there is provided a trip-wire guiding device for a protective fence including a plurality of trip-wires tensioned between a pair of fence poles and connected to detector means for actuating same upon the disturbance of the trip-wires by an attempted penetration of the fence. The trip-wire guiding device includes a ground-anchorable mounting pole having a stake at its lower end insertable into the ground between the pair of fence poles, an elongated trip-wire guiding member, and force-yielding attaching means attaching same in a spaced, force-yielding manner to and laterally of the mounting pole. The elongated trip-wire guiding member is formed with a plurality of longitudinally-spaced openings through which the tensioned trip-wires are freely passed for maintaining them in parallel spaced relationship. Each of the openings is connected by a passageway to an edge of the elongated trip-wire guiding member to permit the side-wise insertion of the respective trip-wire. The elongated trip-wire guiding member is further formed with a channel extending longitudinally therethrough aligned with and passing through the passageways. A common locking member is received in the latter channels for securing the trip-wires, after insertion side-wise into their respective openings, against removal therefrom through the mentioned passageways. The common locking member is fixed at one end to the trip-wire guiding member so as to yield therewith, but permits free longitudinal movement of the tensioned trip-wires in their respective openings in the trip-wire guiding member. The arrangement is such as to actuate the detector means upon a change in tension in the trip-wires, but to preclude disabling the detector means by merely fastening the tensioned trip-wires to the trip-wire guiding member or to the common locking member fixed thereto.

In several preferred embodiments of the invention described below, the elongated trip-wire guiding member includes a pair of parallel legs each formed with one of the openings for each of the wires, the legs being spaced from each other between the openings and the mentioned edge to define the longitudinally-extending channel for receiving the common locking member. More particularly, the elongated member in these embodiments is made of sheet metal bent into a U-shape to define the pair of parallel legs connected together by a web constituting said edge, the connecting passageways being formed through said web. Further, in these described embodiments, the common locking member is a rod inserted through one end of the elongated member into the space between its pair of legs and fastened thereto.

A wire-guiding device constructed in accordance with the foregoing features substantially reduces the cost of manufacture of the device, and also the cost and time for installing the device in a protective fence. In addition, it increases the difficulty of disarming or disabling the fence by removing a wire, since this would require cutting through the common locking member which can be in the form of a hard rod or bar not easily cuttable in the field. Also, the arrangement with the common locking member and the force-yielding attachment of the trip-wire guiding member is such as to cause the detector means to be actuated upon a change in tension in the trip-wires, but to preclude disabling the detector means by merely fastening the tensioned trip-wires to the trip-wire guiding member or to the common locking member fixed thereto. Further, by providing the force-yielding attachment in the form of pivotable rods, the rods may be pivoted within the device when not installed to form a compact unit for shipping or storage purposes.

In other described embodiments, the elongated trip-wire guiding member comprises an open spiral rod, the lateral spaces between adjacent spirals thereof constituting the plurality of openings for the tensioned trip-wires and the passageways permitting their insertion, the axial space through all the spirals constituting the channel extending longitudinally through the elongated member for receiving the common locking member.

In such a construction the open-spiral rod effectively provides an almost unlimited number of openings for the tensioned trip-wires with each opening including an edge passageway permitting the insertion of the respective tensioned trip-wire. The open spiral rod can therefore serve as a basic element which may be used for a wide variety of fences having various numbers of trip-wires and various spacings between the wires. Thus, the spiral rod may be supplied in standard or continuous lengths and merely cut to size at the installation site according to the height of the fence, since the spiral rod can accommodate the specific number of tension fence trip-wires and the specific spacing of the wires at each actual point of installation. This not only substantially reduces the manufacturing costs, but also reduces the installation and inventory costs.

According to another aspect of the invention, there is provided a protective fence including a plurality of trip-wires tensioned between a pair of fence poles and connected to detector means for actuating same upon the disturbance of the wires by an attempted penetration of the fence, and a trip-wire guiding device as set forth above attached in a force-yielding manner to ground-anchoring means intermediate the pair of fence poles for maintaining the tensioned wires in parallel spaced relationship.

Further features and advantages of the invention will be apparent from the description below.

BRIEF DESCRIPTION OF THE DRAWINGS

The invention is herein described, by way of example only, with reference to the accompanying drawings, wherein:

FIG. 5 is an enlarged fragmentary view illustrating another form of trip-wire guiding device constructed in accordance with the invention;

FIG. 6 is a sectional view along lines VI—VI of FIG. 5;

DESCRIPTION OF PREFERRED EMBODIMENTS

Figure 1:
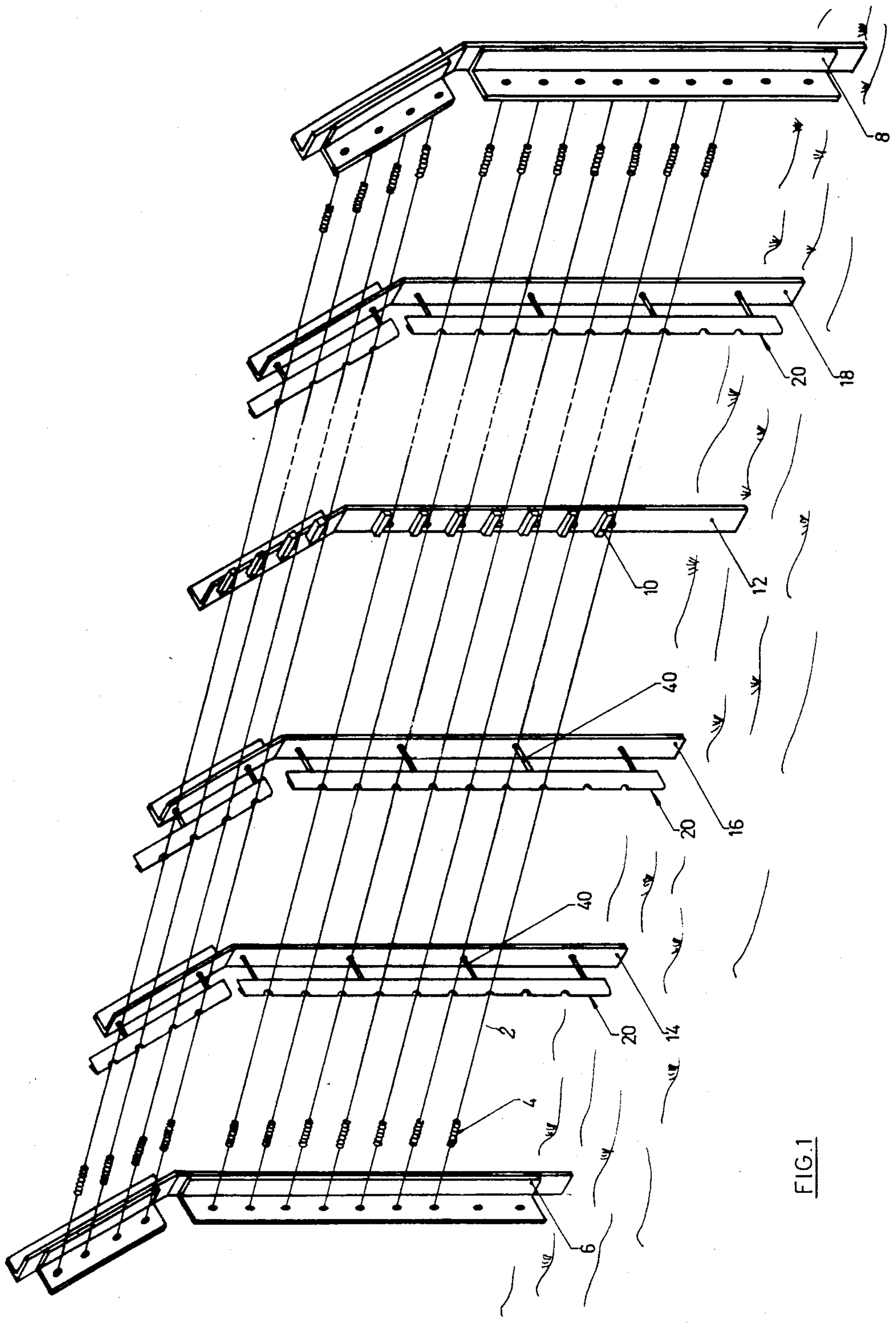
FIG. 1 illustrates a section of one form of protective fence including a trip-wire guiding device constructed in accordance with the invention.

The protective fence illustrated in FIG. 1 comprises a plurality of wires 2 tensioned by springs 4 between a pair of fence poles 6, 8 anchored in the ground, each of the wires 2 being connected to a detector 10 carried by another fence pole 12 intermediate the two fence poles 6, 8. In addition, the protective fence includes further fence poles 14, 16, 18, between fence poles 6, 8 to which the wires are attached, and fence poles 12 carrying the detectors 10. Fence poles 14, 16, 18 each carry a wire-guiding device generally designated 20, for maintaining the wires in parallel spaced relationship so that a pull, displacement, severing, or other disturbance of any of the wires 2 will be transmitted to its respective detector 10.

It will thus be seen that wires 2 serve as trip-wires which sense an attempted intrusion and actuate the detectors 10. These wires could also serve as the barrier wires of the fence, or the fence could include additional barrier wires (not shown in FIG. 1) such as commonly provided in a barbed-wire fence or chain-link fence.

Figure 2:
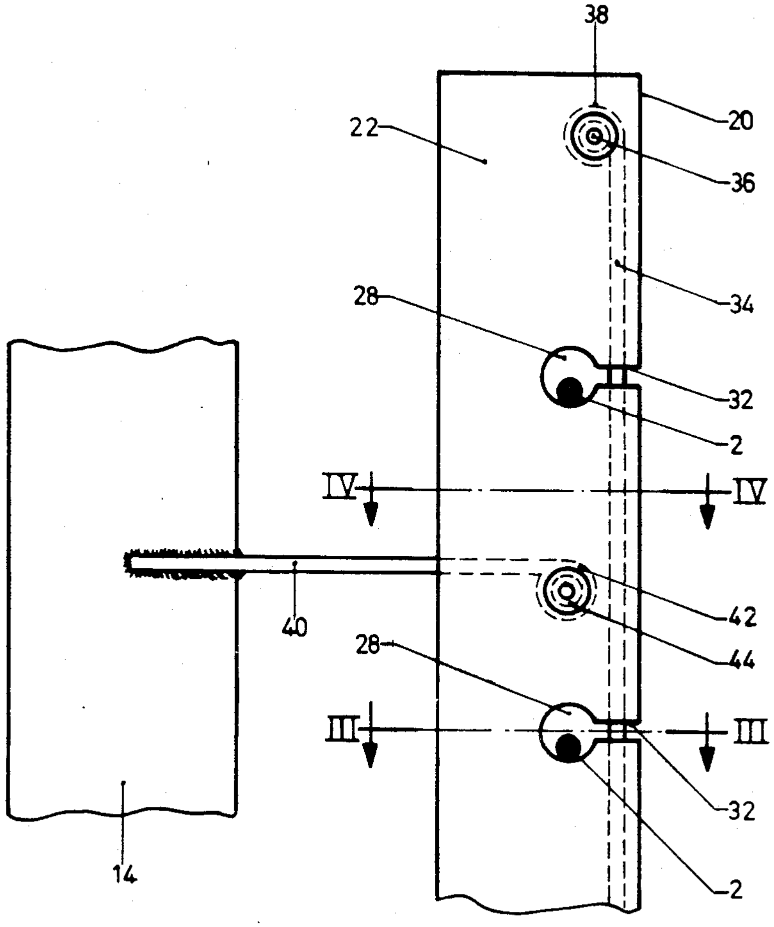
FIG. 2 is an enlarged fragmentary view illustrating a portion of the wire-guiding device in the protective fence of FIG. 1.
Figure 3:
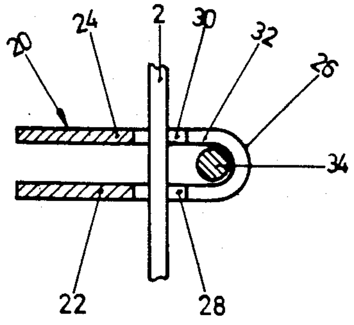
FIG. 3 is a sectional view along lines III—III of FIG. 2.
Figure 4:
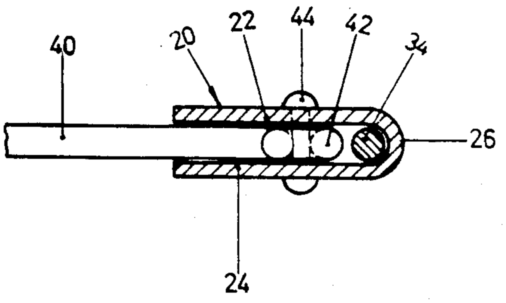
FIG. 4 is a sectional view along lines IV—IV of FIG. 2.

As shown in FIGS. 2–4, each of the wire-guiding devices 20 is made of sheet metal bent into a U-shape to define a pair of parallel legs 22, 24, connected together by a web 26 at the edge of the sheet. For each of the wires 2 in the protective fence, there is formed a pair of openings 28, 30, through legs 22,24. These openings are of larger diameter than the respective wire to permit the wire to freely pass through them. The openings 28, 30, are formed a slight distance inwardly of the connecting web 26, and are connected to outer edge of the bent sheet by passageways or slots 32 formed through the web and of smaller width than the diameter of the openings 28, 30.

Slots 32 permit the wires 2 to be inserted into their respective openings 28, 30 from the edge of the bent sheet defined by the web 26. After the wires have been so inserted, a common locking member, in the form of a rod or bar 34, is inserted from the upper end of the wire-guiding device 20 into the space or channel formed by the two legs 22, 24 of the bent sheet adjacent to its connecting web 26. The common locking rod 34 is then fixed in place by passing a rivet 36 through the two legs 22, 24 of the guiding device, and an eye 38 formed at the upper end of the locking rod 34. If desired, the locking rod 34 may be formed with one or more additional eyes at the lower end, or at intermediate points, for more firmly securing the locking rod to the guiding device.

The guiding device 20 furtherincludes a plurality of parallel, spaced short rods 40 received between the pair of legs 22, 24 at longitudinally spaced points of the guiding device for attaching it to its respective fence pole, e.g. 14. Each of the attaching rods 40 is also formed with an eye 42 at one end received between the two legs 22, 24 of the guiding device 20, and projects through the edge of the guiding device opposite to its web 26 for attachment to the respective fence pole. Preferably, the attaching rods 40 are each pivotably mounted by a pin 44 to the guiding device so as to permit pivoting the rods between the legs 22, 24 to provide a compact unit for shipping and storage purposes. When the guiding device is to be installed in the field, the attaching rods 40 are pivoted outwardly to their illustrated positions, and their free ends are attached to the respective fence pole by welding, rivetting, or other suitable fastening means.

The guiding device illustrated in FIGS. 1–4 may be a part of a new installation of a protective fence, or may be added to an existing protective fence installation. In either case, after the protective fence has been installed with the wires 2 tensioned by springs 4 between the two end fence poles 6, 8, and attached to the detectors 10 carried by the intermediate fence pole 12, the wire-guiding fence poles 14, 16, 18 are anchored in the ground, and a wire-guiding device 20 is attached by the attaching rods 40 to its respective pole 14, 16, 18. The common locking bar 34 is removed from the wire-guiding devices 20, and each wire 2 is inserted through one of the slots 32 into its respective pair of openings 28, 30. The common locking bar 34 is then inserted from one end of the guiding device 20 and is locked in position by applying rivets 36 through one or more of the eyes 38 formed in the common locking bar. After the fence is so installed with the wires maintained in spaced parallel relationship by the wire-guiding devices 20, the wires are connected to their respective detectors 10 carried by fence pole 12.

It will thus be seen that a cutting, spreading apart, or pulling-down of any of the wires 2 in an attempt to penetrate the fence will be transmitted as a pulling force to its respective detector 10 which will produce a signal to indicate this attempt. If an attempt is made to disarm any of the wires by securing it to its respective guiding device 20 or common locking bar 34, and thus to prevent the transmission of a force to its respective detector, the force will nevertheless be transmitted because attaching rods 40 will yield or bend, thereby causing the whole guide device 20 to move with the force applied to the respective wire, thereby transmitting this force to the respective detector 10. If an attempt is made to disarm the device by removing the wire from the guiding device 20, this will require cutting through, or removal of, the locking bar 34. This bar can be made of hard metal difficult to cut. Its removal can also be made difficult by the type and number of rivets 36 used for fastening the locking bar to the guiding device.

It will thus be seen that the guiding device illustrated in FIGS. 1–4 provides the above-described advantages of simplicity of construction and installation, difficulty of disarming by removing the wires, and compactness for storage and shipping purposes.

FIGS. 5 and 6 illustrate a second embodiment of the invention which may be used for the fence poles 14, 16, 18 to anchor the guiding device into the ground, and the force-yielding rods 40 for attaching the guiding device in a force-yielding manner.

Thus, as shown in FIGS. 5 and 6, the guiding device, generally designated 120, is in the form of a metal sheet bent into an L-shape. One section 122 of the L-shaped sheet is formed with the openings 124 and the connecting slots 126 for receiving the trip wires 102, the trip wires being retained in these openings against removal by a common locking bar 134 in the same manner as described above with respect to FIGS. 1–4. The other section 142 of the L-shaped sheet 120 serves as a fence post. Its lower end is secured by fasteners 144, 146, to a stake 148 anchored in the ground.

It will be appreciated that section 122 of the L-shaped sheet 120 is bent on itself to form the two legs for receiving the wires 102 and the locking bar 134, in the same manner as described above with respect to FIGS. 1–4. The free end of section 142 may also be bent-over into a U-shape, as shown by leg 150 in FIG. 6, to provide rigidity to section 142. It will be appreciated that the intermediate portion 152 of section 122, extending between the bent-over edge of that section to the juncture with section 142, will yield to a force applied to it in the direction of the fence wires 102. This intermediate portion therefore serves the same function as the force-yielding rods 40 in the FIGS. 1–4 embodiment.

FIGS. 7–11 illustrate two further forms of trip-wire guiding devices which may be used in the protective fence illustrated in FIG. 1 for device 20. The wire-guiding devices of FIGS. 7–11 are also attached to ground anchoring means, namely fence pole 214 and 314, respectively, in a force-yielding manner to prevent disarming the device by securing the tensioned trip-wires to the guiding device, and thus prevent the transmission of a force to the respective detector.

Figure 7:
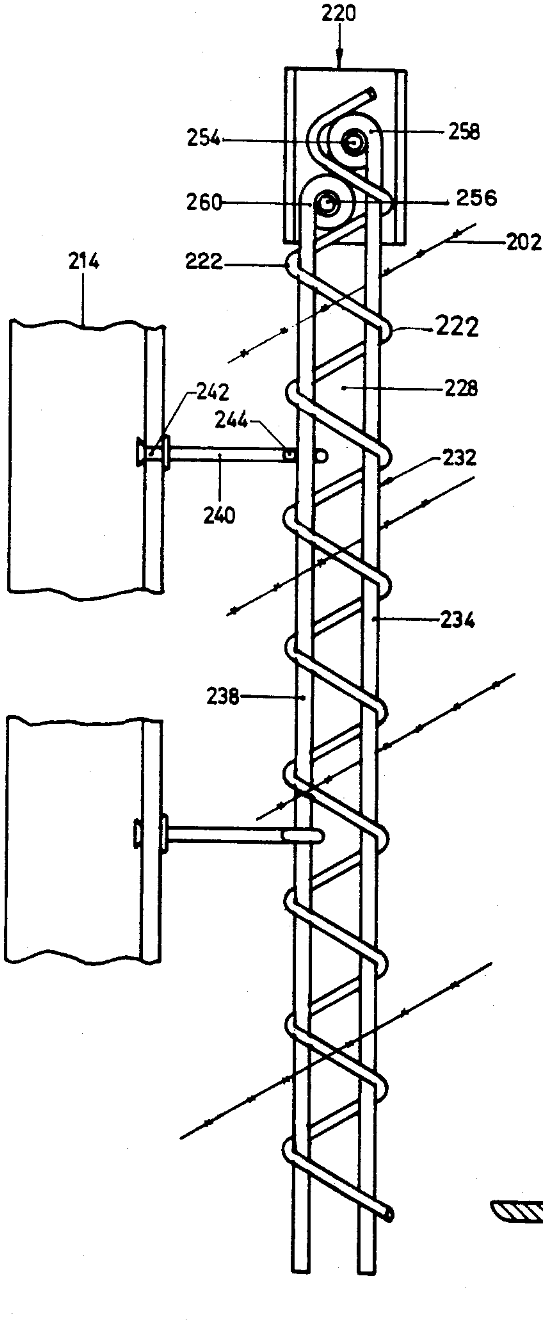
FIG. 7 is an enlarged fragmentary view illustrating a portion of another trip-wire guiding device constructed in accordance with the invention.
Figure 8:
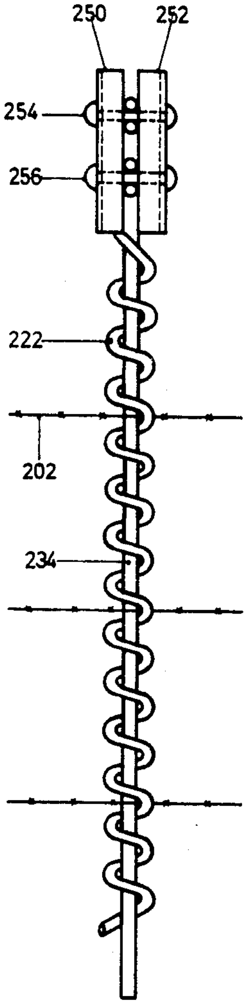
FIG. 8 is an end elevational view of the wire-guiding device of FIG. 7.
Figure 9:
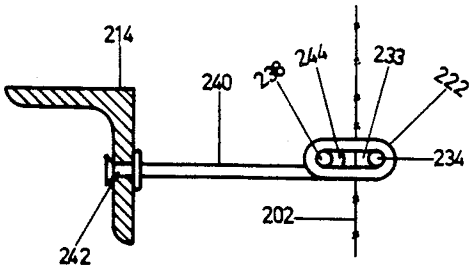
FIG. 9 is a top plan view of the wire-guiding device of FIG. 7.

The wire guiding device 220 illustrated in FIGS. 7–9 comprises an elongated member in the form of an open spiral rod 222, in which the lateral spaces between adjacent spirals constitute the openings 228 for the tensioned trip-wires 202 and also the edge passageways or slots 232 permitting the insertion of the wires, these elements corresponding to openings 28 and slots 32 in the embodiment of FIGS. 1–4. In addition, the axial space 233 (FIG. 9) through all the spirals constitutes an elongated channel (corresponding to the channel between the two legs 22, 24 in the embodiment of FIGS. 1–4) extending longitudinally through the open spiral rod 222 for the reception of the common locking member. The latter is in the form of a straight rod 234 passed longitudinally through the spirals.

As shown particularly in FIG. 9, the open spiral rod 222 is flattened, so that its spirals are each of a width substantially less than its length. The inner diameter of the spiral in width is approximately the same, or slightly greater than, the outer diameter of the straight rod 234 serving as the common locking member for the tensioned wires 202.

The open-spiral guiding member 222 is attached to the fence pole 214 in a laterally-spaced force-yielding manner by means of another straight rod 238 received longitudinally through the spirals for connection to a plurality of short rods 240 secured to the fence poles 214. Each guiding device 220 may be attached by means of a plurality, e.g. four (only two of which are illustrated in FIG. 7) of such short rods 240.

As shown in FIGS. 7 and 9, each of the short rods 240 is secured at one end to the fence pole 214 by means of a rivet 242, or other securing means, and is formed at its opposite end with an eye 244 oriented so that the axis through the opening in the eye is in the vertical direction. The eyes 244 of all the short rods 240 are disposed in the space between adjacent spirals of the spiral rod 220 such as to receive through their eyes the common securing rod 238 when passed longitudinally through the spirals of the guiding device.

The upper ends of the two straight rods 234 and 238 are secured to the open-spiral rod 222 by means of a pair of apertured plates 250, 252 for receiving pins 254, 256 (e.g., rivets or other fastener devices) passing through the apertures in the plates, and also through eyes 258, 260 formed in the upper ends of the two straight rods 234, 238. The lower end of the rods 234, 238 is preferably secured in the same manner to the open-spiral rod 222 at its lower end, but this is not illustrated in the drawings for the sake of brevity.

The guiding device illustrated in FIGS. 7–9 of the drawings is installed in the field in the following manner:

the main element of the guiding device, namely the open-spiral rod 222, may be supplied in continuous or standard lengths and cut to size in the field according to the height of the fence at the specific location of the guiding device. The open-spiral construction of the guiding device provides, as mentioned above, a wide variety of possibilities for receiving almost any specific number of trip wires 202, and at almost any specific spacing of the trip wires, at the particular installation location.

To attach the open spiral rod 222 to the fence pole 214, the short rods 240 are first secured to the fence pole by rivets 242 (or other suitable securing means) with the rods 240 extending horizontally and with their eyes 244 open vertically. The open spiral rod 222 is then applied laterally to receive the eyes 244 between its open spirals, and the common locking rod 238 is then inserted through the end (e.g. upper) of the open spirals and through the aligned eyes 244 of the short rods 240.

The tensioned trip wires 202 are then passed laterally between the open spirals of the spiral rod 222, and the common locking rod 234 is inserted through the open spirals so as to lock the tensioned trip-wires 202 within the spaces.

Finally, the apertured plates 250, 252 are applied to the upper ends of the straight rods 234, 238, and of the spiral rod 222; and rivets 254, 256 (or other pin-type fasteners) are passed through the apertures in plate 250, 252 and through the eyes 258, 260 at the upper ends of the straight rods 232, 238. A similar attaching arrangement is made at the lower ends of the spiral rod 222 and the straight rods 234, 238.

The assembly thus provides a sturdy guiding device for maintaining the tensioned trip-wires 202 in parallel spaced relationship so that a pull, displacement, severing or other disturbance of any of the wires 202 will be transmitted to its respective detector. The short rods 240 provide a force-yielding attachment of the guiding device 220 to the fence pole 214 so as to prevent disarming any of the wires by securing it to its respective guiding device or either of the two straight rods 234, 238.

It will thus be seen that a very inexpensive and an easily attachable guiding device is provided for use with protective fences of different heights, different numbers of fence wires, and different spacing of fense wires.

Figure 10:
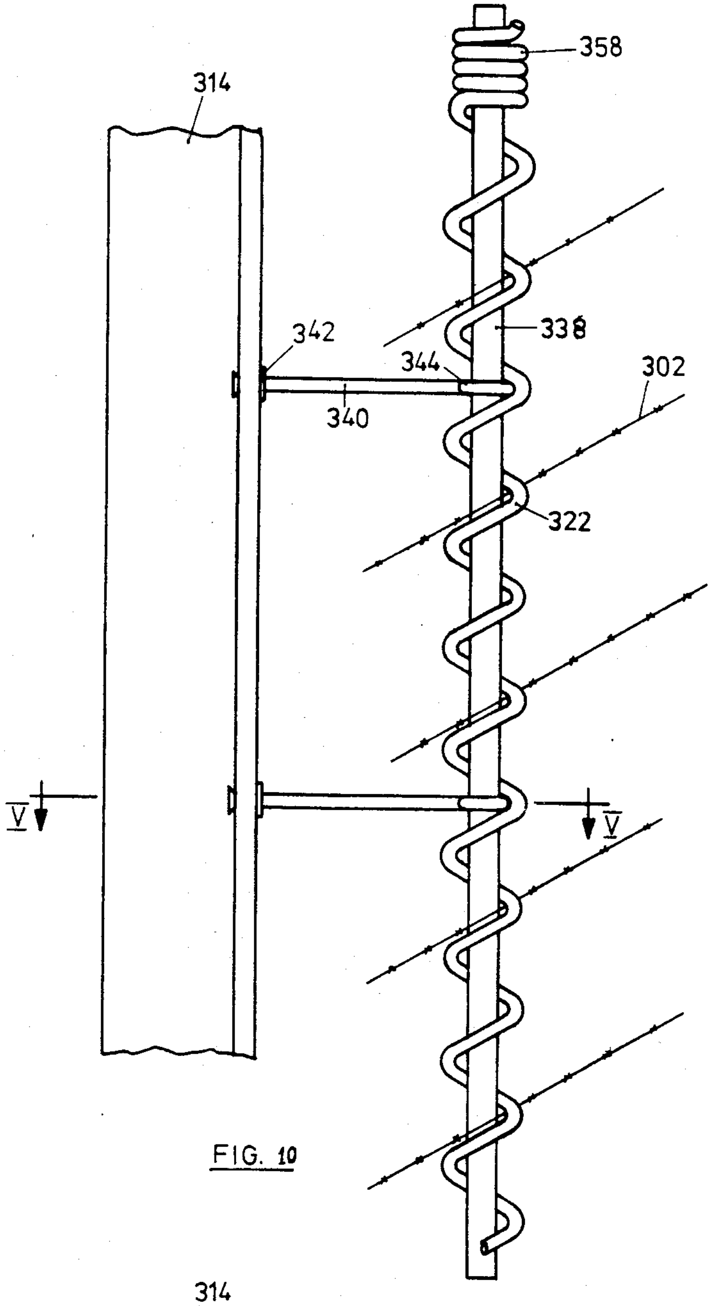
FIG. 10 is a view similar to that of FIG. 8 illustrating still another form of trip-wire guiding device constructed in accordance with the invention.
Figure 11:
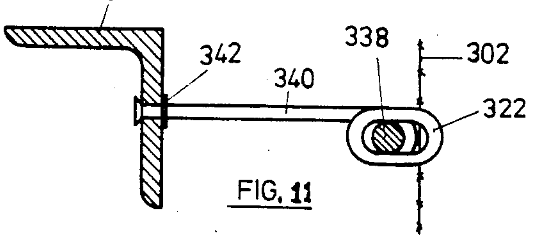
FIG. 11 is a sectional view along lines V—V of FIG. 10.

FIGS. 10 and 11 illustrate another form of wire-guiding device including but one straight rod, therein designated 338, serving the functions of the two straight rods 234 and 238 in the arrangement of FIGS. 7–9. Thus, the arrangement in FIGS. 10 and 11 includes a flattened open spiral rod 322 adapted to receive the tensioned trip-wires 302 in its lateral spaces between adjacent spirals, and the straight rod 338 passed longitudinally through the spirals and serving as the common locking member for locking the tensioned wires within the spirals. The open-spiral rod 322 is attached to the fence pole 314 in a force-yielding manner by means of a plurality of short rods 340 secured at one end to the fence pole by means of rivets 342, and formed at their opposite ends with eyes 344 oriented so as to receive the common locking rod 334. The upper end of the spiral rod 322 is wrapped, as shown at 358, around the straight rod 338; the lower end of the spiral rod may be attached in the same manner to the straight rod.

While the invention has been described with respect to a protective fence for detecting and protecting against intrusions, it will be appreciated that this application has been described for purposes of example only, and that the invention could be used in fencing construction in general to support the wires in parallel spaced relationship. Further, the guiding device may be used as an intermediate floating guide and not attached to any fence pole. Also, instead of using a flattened spiral rod, the spirals may be of circular configuration. Other variations, modifications and applications of the invention will be appreciated.

What is claimed is:

1. A trip-wire guiding device for a protective fence including a plurality of trip-wires tensioned between a pair of fence poles and connected to detector means for actuating same upon the disturbance of said trip-wires by an attempted penetration of the fence; said trip-wire guiding device including a ground-anchorable mounting pole having a stake at its lower end insertable into the ground between said pair of fence poles, an elongated trip-wire guiding means, and force-yielding attaching means attaching the elongated guiding means in a spaced, force-yielding manner to and laterally of said mounting pole; said elongated trip-wire guiding means comprising an open-spiral rod having lateral spaces between adjacent spirals which spaces serve as longitudinally-spaced openings through which said trip-wires are to be passed by sidewise insertion for maintaining them in parallel space relationship; the axial space through all the spirals constituting an axial channel extending longitudinally through the open-spiral rod; and a common locking member received in said axial channel of the open-spiral rod for locking the trip-wires against removal through the lateral spaces between adjacent spirals, while permitting free longitudinal movement of the tensioned trip-wires such as to cause the detector means to be actuated upon a change in tension in the trip-wires; said force-yielding attaching means including a plurality of short rods attachable at one end to said ground-anchorable mounting pole and formed with eyes at their opposite ends disposed in the spaces between adjacent spirals of the open-spiral rod, said elongated trip-wire guiding means further including a second straight rod passed through said axial channel through the open-spiral rod and through the eyes of the plurality of short rods.

2. The device according to claim 1, wherein said two straight rods are secured within the open-spiral rod by securing means including apertured plates attached to the upper end of the straight rods by pins passing through the apertures of said plate and eyes formed at the upper end of said straight rods.

3. The device according to claim 2, wherein said two straight rods are further secured within said open-spiral rod by additional securing means including additional apertured plates attached to the lower end of the two straight rods by pins passing through the apertures of said plates and eyes formed at the lower end of the straight rods.

4. The device according to claim 2, wherein said pins in said securing means are rivets.

5. A trip-wire guiding device for a protective fence including a plurality of trip-wires tensioned between a pair of fence poles and connected to detector means for actuating same upon the disturbance of said trip-wires by an attempted penetration of the fence; said trip-wire guiding device including a ground-anchorable mounting pole having a stake at its lower end insertable into the ground between said pair of fence poles, an elongated trip-wire guiding means, and force-yielding attaching means attaching the elongated guiding means in a spaced, force-yielding manner to and laterally of said mounting pole; said elongated trip-wire guiding means comprising an open-spiral rod having lateral spaces between adjacent spirals which spaces serve as longitudinally-spaced openings through which said trip-wires are to be passed by sidewise insertion for maintaining them in parallel space relationship; the axial space through all the spirals constituting an axial channel extending longitudinally through the open-spiral rod; said force-yielding attaching means including a plurality of short rods attachable at one end to said ground-anchorable mounting pole and formed with eyes at their opposite ends disposed in the spaces between adjacent spirals of the open-spiral rod; said trip-wire guiding device further including rod means passing through said axial channel of the open-spiral rod for locking the trip-wires against sidewise removal while permitting longitudinal movement thereof, and also passing through the eyes of the plurality of short rods for attaching the open spiral rod to the mounting pole in a force-yielding manner.

6. The device according to claim 5, wherein said rod means comprises a pair of straight rods passing through said axial channel of the open spiral rod, one of said straight rods passing through the eyes of said plurality of short rods for attaching the open-spiral rod to the mounting pole in a force-yielding manner, the other of said straight rods passing between the eyes of said plurality of short rods and the inner face of said open-spiral rod and serving to lock the trip-wires against sidewise removal from the open-spiral rod.

7. The device according to claim 6, wherein said open-spiral rod is flattened so that its spiral are each of a width substantially less than its length, said pair of straight rods being disposed on opposite sides of said flattened spiral rod.

8. The device according to claim 5, wherein said rod means comprises a single straight rod passing through said axial conduit and through all the eyes of said plurality of short rods.

* * * * *